Sept. 12, 1950     E. R. TRAXLER     2,522,148
MULTIPLE BELT MULE DRIVE
Filed April 1, 1946
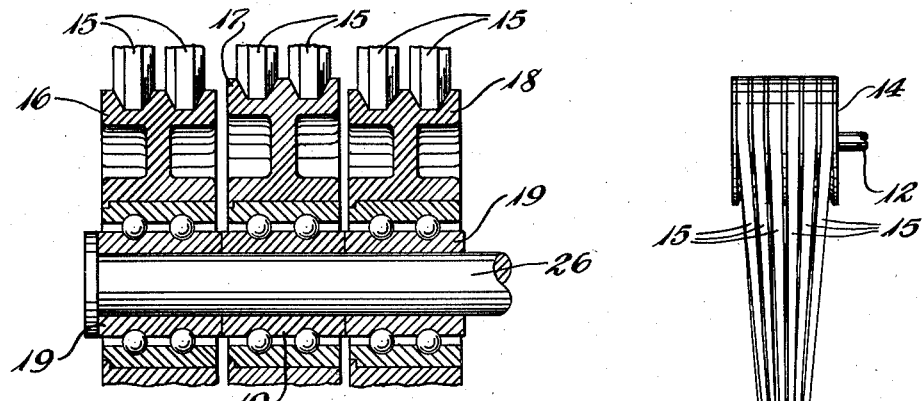
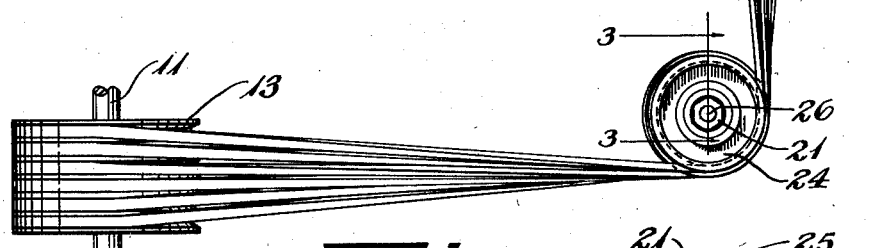
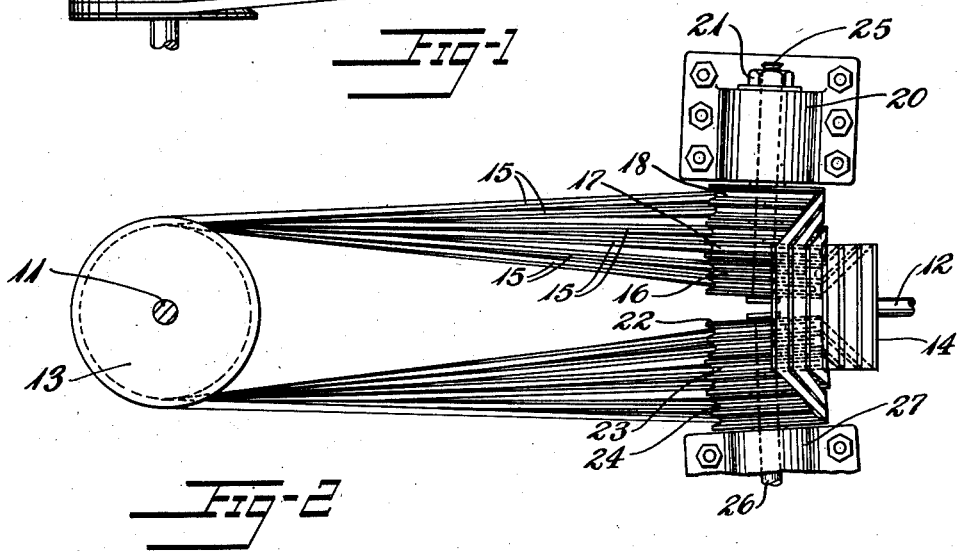
Inventor
Eugene R. Traxler Patented Sept. 12, 1950

2,522,148

UNITED STATES PATENT OFFICE 2,522,148

MULTIPLE BELT MULE DRIVE

Eugene R. Traxler, Stowe, Ohio, assignor to The B. F. Goodrich Company, New York, N. Y., a corporation of New York Application April 1, 1946, Serial No. 658,731

8 Claims. (Cl. 74—226)

This invention relates to power transmission by multiple belts and to improved drives of the mule type. The invention is of benefit especially in installations of V-belts where the center distance from the driver to the idlers and the idlers to the driven pulley is short and the band of belts is wide; although the invention is useful also in drives in which the centers are spaced apart a relatively greater distance.

Heretofore, in the use of single idling or mule pulleys in multiple belt mule drives, when the band of belts was wide because of the large carried load and the center distances from the mule pulleys to the driver and driven were short, the lengths necessary for the outer and center belts have been different. With a set of belts of the same length applied to this type of drive, the outside belts will be relatively tight and the center belts will be relatively slack. The relatively loose belts will tend to slip and the relatively tight belts will tend to creep, both undesirable characteristics because they cause wear and loss of power.

Objects of the invention are to provide for eliminating or avoiding the foregoing and other difficulties; to provide for greater power-transmitting capacity and increased belt life in drives of the mule type; to provide for the effective utilization of multiple V-belts of equal length in a drive of the mule type; to provide for effective operation with short pulley-center distances, especially in a V-belt mule drive installation, and to provide for simplicity in construction and efficiency of operation.

Referring to the drawings:

Fig. 1 is an elevation of a multiple V-belt mule drive constructed in accordance with and embodying the invention, parts being broken away.

Fig. 2 is a plan view of the drive of Fig. 1.

Fig. 3 is a sectional view taken along the line 3—3 in Fig. 1.

The present invention makes possible belt paths of equal lengths or substantially so, by a special construction of the idler or mule pulleys, the arrangement being such as to equalize the stress on the belts and allow a large load to be carried. The creep and slippage that have been experienced with prior mule pulley arrangements are substantially eliminated or reduced by the invention.

The drive of the embodiment of the invention illustrated comprises a driving shaft 11 driving a driven shaft 12 by means of grooved pulleys 13 and 14, mounted upon the shafts and coacting with a series of endless V-belts 15 of equal length. The driving shaft 11 and driven shaft 12 axes are not parallel and may be mounted at substantially right angles, as shown. The V-belts 15 pass over two groups of grooved idler pulleys 16, 17 and 18 in one group and 22, 23 and 24 in the other, said pulleys guiding and turning the V-belts 15. In turning the band of belts 15, the center belts would tend to have a shorter belt path than those of the outer belts if the idler pulleys 16, 17, 18, 22, 23 and 24 were of the same diameter. A constant length belt path for all the belts is desirable owing to the fact that sets of industrial V-belts are usually matched to the same length. To accommodate belts of the same length, the center idler pulleys 17 and 23 of each group have larger pitch diameters than the outer idler pulleys 16, 18, 22 and 24 by an amount necessary to equalize substantially the center belt paths and the outer belt paths. Said idler pulleys 16, 17, 18, 22, 23 and 24 rotate on separate bearings 19, preferably of the anti-friction type, secured to their respective idler shafts 25 and 26. The idler shafts 25 and 26 are mounted in brackets 20 and 27, by nuts 21 screwed on the threaded ends of the idler shafts 25 and 26. Said brackets 20 and 27 are mounted in such a position that the idling pulleys 16, 17, 18, 22, 23 and 24 will guide the V-belts 15 from the driving pulley 13 to the driven pulley 14.

Variations may be made without departing from the scope of the invention as it is hereinafter claimed.

I claim:

1. A multiple belt mule drive comprising driving and driven pulleys on non-parallel axes, a plurality of independently rotatable idler pulleys intermediate the first said pulleys, and a plurality of belts of substantially equal length about said driving and driven pulleys, a belt passing over one of said idler pulleys and another belt passing over another idler pulley, said idler pulleys being constructed and arranged in side-by-side relationship with said driving and driven and idler pulleys together presenting substantially equal belt paths for said belts despite the belt turns required by virtue of the non-parallel axes of said driving and driven pulleys.

2. A multiple V-belt mule drive comprising grooved driving and driven pulleys on non-parallel axes, a plurality of independently rotatable grooved idler pulleys intermediate the first said pulleys, and a plurality of V-belts of substantially equal length in the grooves of said driving and driven pulleys, a V-belt passing over one of said grooved idler pulleys and another V-belt passing over another grooved idler pulley, said idler pulleys being constructed and arranged in side-by-side relationship with said driving and driven and idler pulleys together presenting substantially equal belt paths for said V-belts despite the belt turns required by virtue of the non-parallel axes of said driving and driven pulleys.

3. A multiple belt mule drive comprising a driving pulley and a driven pulley on non-parallel axes, idler pulleys intermediate said driving pulley and said driven pulley, a plurality of belts of substantially equal lengths disposed in a band about the driving pulley, the intermediate idler pulleys and the driven pulley, said intermediate idler pulleys comprising groups of idler pulleys, each group comprising a center idler pulley and side pulleys coaxial with and at each side of said center idler pulley, the innermost of said band of belts being carried by said center idler pulley and the outer belts of said band being carried by said side pulleys, said side pulleys having diameters smaller than the diameters of said center idler pulley by an amount to equalize substantially the paths of said belts.

4. A multiple V-belt mule drive comprising a grooved driving pulley and a grooved driven pulley on non-parallel axes, grooved idler pulleys intermediate said driving pulley and said driven pulley, a plurality of V-belts of substantially equal length disposed in a band in the grooves of said driving pulley, idler pulleys and driven pulley, said intermediate idler pulleys comprising groups of grooved idler pulleys, each group comprising a center idler pulley and side pulleys coaxial with and at each side of said center idler pulley, the innermost of said band of belts being carried by said center idler pulley and the outer belts of said band being carried by said side pulleys, said side pulleys having pitch diameters smaller than the pitch diameters of said idler pulley by an amount to equalize substantially the belt paths of said V-belts despite the turns of the belts required by virtue of the non-parallel axes of said driving and driven pulleys.

5. A multiple V-belt mule drive comprising a driving pulley and a driven pulley on non-parallel axes, idler pulleys intermediate said driving pulley and said driven pulley, each of said pulleys having a plurality of grooves for carrying a plurality of V-belts of substantially equal length disposed in a band about said driving, driven and idler pulleys, said intermediate idler pulleys comprising groups of grooved idler pulleys, each group comprising a center idler pulley having a plurality of grooves and side pulleys co-axial with and at each side of said center idler pulley each having a plurality of grooves, the innermost of said band of belts being carried by said center idler pulley and the outer belts of said band being carried by said side pulleys, the pitch diameters of the grooves of said side pulleys being smaller than the pitch diameters of the grooves of said idler pulley by an amount to equalize substantially the belt paths of said V-belts despite the turns of the belts required by virtue of the non-parallel axes of said driving and driven pulleys.

6. A multiple belt mule drive comprising a driving pulley and a driven pulley on non-parallel axes, idler pulleys intermediate said driving pulley and said driven pulley, a plurality of belts of substantially equal lengths disposed in a band about the driving pulley, the intermediate idler pulleys and the driven pulleys, said idler pulleys comprising groups of idler pulleys, each group comprising coaxial idler pulleys having diameters differing by an amount to equalize substantially the paths of said belts despite the turns required by virtue of the non-parallel axes of said driving and driven pulleys.

7. A multiple V-belt mule drive comprising a grooved driving pulley and a grooved driven pulley on non-parallel axes, grooved idler pulleys intermediate said driving and driven pulleys, a plurality of V-belts of substantially equal length disposed in a band in the grooves of said driving pulley, idler pulleys and driven pulleys, said idler pulleys comprising groups of grooved idler pulleys, each group comprising coaxial idler pulleys having pitch diameters differing by an amount to equalize substantially the belt paths of said V-belts despite the turns of the belts required by virtue of the non-parallel axes of said driving and driven pulleys.

8. A multiple V-belt mule drive comprising grooved driving and driven pulleys on non-parallel axes, a plurality of independently rotatable grooved idler pulleys intermediate the first said pulleys, and a plurality of V-belts of substantially equal length in the grooves of said driving and driven pulleys, a V-belt passing over one of said grooved idler pulleys and another V-belt passing over another grooved idler pulley, said idler pulleys being so angularly disposed in relation to said driving and driven pulleys and the pitch diameters of all said pulleys being so related to one another as to provide substantially equal belt paths for said V-belts despite the belt turns required by virtue of the non-parallel axes of said driving and driven pulleys.

EUGENE R. TRAXLER.

REFERENCES CITED

The following references are of record in the file of this patent:

UNITED STATES PATENTS

| Number | Name | Date |
| --- | --- | --- |
| 423,046 | Gregg | Mar. 11, 1890 |
| 1,031,106 | Camp | July 2, 1912 |
| 1,823,493 | Hubbard | Sept. 15, 1931 |